(12) United States Patent
Wrabetz et al.

(10) Patent No.: US 8,131,684 B2
(45) Date of Patent: *Mar. 6, 2012

(54) ADAPTIVE ARCHIVE DATA MANAGEMENT

(75) Inventors: Joan Wrabetz, Mountain View, CA (US); Aloke Guha, Louisville, CO (US)

(73) Assignee: Aumni Data Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/052,856

(22) Filed: Mar. 21, 2011

(65) Prior Publication Data

US 2011/0231372 A1  Sep. 22, 2011

Related U.S. Application Data

(63) Continuation of application No. 12/105,598, filed on Apr. 18, 2008, now Pat. No. 7,912,816.

(60) Provisional application No. 60/912,652, filed on Apr. 18, 2007, provisional application No. 61/012,761, filed on Dec. 10, 2007.

(51) Int. Cl.
*G06F 17/30* (2006.01)

(52) U.S. Cl. ......... 707/661; 707/722; 707/739; 711/161

(58) Field of Classification Search ............... 707/661, 707/705, 722, 736, 739; 711/111, 147, 150, 711/151, 161
See application file for complete search history.

(56) References Cited

U.S. PATENT DOCUMENTS

| | | | |
|---|---|---|---|
| 6,250,930 B1 * | 6/2001 | Mintz | 434/323 |
| 6,360,216 B1 | 3/2002 | Hennessey et al. | |
| 6,564,202 B1 | 5/2003 | Schuetze et al. | |
| 6,694,307 B2 | 2/2004 | Julien | |
| 6,697,998 B1 | 2/2004 | Damerau et al. | |
| 6,968,338 B1 | 11/2005 | Gawdiak et al. | |

(Continued)

FOREIGN PATENT DOCUMENTS

WO    WO2009/009192 A2    1/2009

OTHER PUBLICATIONS

Application and File History of U.S. Appl. No. 12/105,598, Inventors Guha et al., filed Apr. 18, 2008.

(Continued)

*Primary Examiner* — Fred I Ehichioya
(74) *Attorney, Agent, or Firm* — Patterson Thuente Christensen Pedersen, P.A.

(57) ABSTRACT

In one embodiment, input is received from a user defining a classification and an analytic for the classification. Multiple classifications and analytics may be defined by a user. A definition of relevance parameters is determined that characterize the classification and a set of analytics measures associated with the analytic. The definition may be for the classification. Unstructured data and structured data are analyzed based on the definition of the relevance parameters to determine relevant data in the unstructured data and the structured data. The relevant data being data that is determined to be relevant to the classification defined by the user. An index of the terms from the relevant data is determined. The index is useable by an analytics tool to provide results for queries of the unstructured data and structured data. The query may be used within the classification such that targeted results are provided using the index and the relevant data to the classification. Thus, queries from different classifications may be performed efficiently using data determined to be relevant to the classification.

20 Claims, 11 Drawing Sheets

U.S. PATENT DOCUMENTS

| | | | |
|---|---|---|---|
| 7,194,483 | B1 | 3/2007 | Mohan et al. |
| 7,389,306 | B2 | 6/2008 | Schuetze et al. |
| 7,395,256 | B2 | 7/2008 | Ji et al. |
| 7,409,393 | B2 | 8/2008 | Gregoire et al. |
| 7,630,946 | B2 | 12/2009 | Acharya |
| 7,634,467 | B2 | 12/2009 | Ryan et al. |
| 7,647,335 | B1* | 1/2010 | Colecchia ............ 707/999.102 |
| 7,657,506 | B2 | 2/2010 | Levin |
| 7,809,726 | B2 | 10/2010 | Flanagan |
| 7,813,919 | B2 | 10/2010 | Goutte |
| 7,853,595 | B2 | 12/2010 | Chew et al. |
| 7,890,514 | B1 | 2/2011 | Mohan et al. |
| 7,912,816 | B2 | 3/2011 | Guha et al. |
| 2002/0143755 | A1* | 10/2002 | Wynblatt et al. ............ 707/3 |
| 2005/0108256 | A1 | 5/2005 | Wakefield et al. |
| 2006/0026114 | A1* | 2/2006 | Gregoire et al. ............ 707/1 |
| 2006/0161531 | A1* | 7/2006 | Khandelwal et al. ......... 707/3 |
| 2007/0011134 | A1 | 1/2007 | Langseth et al. |
| 2007/0112714 | A1 | 5/2007 | Fairweather |
| 2008/0027893 | A1* | 1/2008 | Cavestro et al. ............ 707/1 |
| 2008/0189163 | A1 | 8/2008 | Rosenberg et al. |
| 2008/0263029 | A1 | 10/2008 | Guha et al. |
| 2009/0157812 | A1 | 6/2009 | Bavly et al. |
| 2009/0164416 | A1 | 6/2009 | Guha et al. |
| 2010/0114899 | A1 | 5/2010 | Guha et al. |

OTHER PUBLICATIONS

Application and File History of U.S. Appl. No. 12/331,363, Inventor Guha, filed Dec. 9, 2008.

Application and File History of U.S. Appl. No. 12/587,492, Inventor Guha, filed Oct. 7, 2009.

Lucene, aquired at: http://lucene.apache.org/, the Apache Software Foundation, 2007, 4 pages.

Xiaojin Zhu, "Semi-Supervised Learning Tutorial," International Conference on Machine Learning (ICML), Jun. 2007, 156 pages.

T. Joachims, et al., Search Engines that Learn from Implicit Feedback, IEEE Computer, IEEE Computer, vol. 40, No. 8, Aug. 2007, 7 pages.

D. Eck, et al., "Autotagging Music Using Supervised Machine Learning," 8th International Conference on Music Information Retrieval (ISMIR), Sep. 2007, 2 pages.

F. Radlinski, et al. "Active Exploration for Learning Rankings from Clickthrough Data," Proceedings of the ACM Conference on Knowledge Discovery and Data Mining (KDD), ACM, Aug. 2007, 10 pages.

M. Hearst, "Clusteririg versus Faceted Categories for Information Exploration,"Communication of ACM, Apr. 2006, pp. 59-61.

C.J.C. Burges, "A Tutorial on Support Vector Machines for Pattern Recognition, Data Mining and Knowledge Discovery," 2, 121-167, Kluwer Academic Publishers, Boston, 1998, 47 pages.

David M. Blei, et al., "Latent Dirichlet Allocation," Journal of Machine Learning Research 3 (2003), pp. 993-1022.

PCT/US08/060755, filed Apr. 18, 2008, Applicant Aumni Data, Inc., Written Opinion dated Mar. 31, 2009, 4 pages.

PCT/US08/060755, filed Apr. 18, 2008 Applicant Aumni Data, Inc., Search Report dated Mar. 31, 2009, 2 pages.

* cited by examiner

ADAPTIVE ARCHIVE DATA MANAGEMENT

RELATED APPLICATION

This application is a continuation of application Ser. No. 12/105,598 filed Apr. 18, 2008, now U.S. Pat. No. 7,912,816 issued Mar. 22, 2011, which claims the benefit of U.S. Provisional Application No. 60/912,652 filed Apr. 18, 2007, and which claims the benefit of U.S. Provisional Application No. 61/012,761 filed Dec. 10, 2007, each of which is hereby fully incorporated herein by reference.

BACKGROUND

Particular embodiments relate to electronic archive data management and more specifically to a data management system configured to classify, analyze and query data maintained in unstructured format such as file systems, web logs, wilds, email text, image, audio, video and other multimedia data Various methods of managing collections of data (e.g., databases) have been developed since data was first stored in electronic form so as to enable efficient retrieval and extract desired information. From initial systems and applications that simply collected data in one or more database files to present sophisticated database management systems (DBMS), different solutions have been developed to meet different requirements. Early solutions may have had the advantage of simplicity but became obsolete for a variety of factors, such as the need to store large—even vast—quantities of data, a desire for more sophisticated search and/or retrieval techniques (e.g., based on relationships between data), the need to store different types of data (e.g., audio, video, and the like). Later approaches have concentrated on populating databases using automated techniques. Such techniques, of which federated searches, web crawlers and content extraction engines are examples, often act as mere agents for adding data on to a database in specific formats or to solve specific problems. The databases created as a result of the action of such agents is often extremely structured and specific to format types and issues of the data being added.

In short, today's database management systems have been designed to manage structured data, typically along a single dimension, very effectively. However today's database management schemes have still not evolved towards managing data that are multi-dimensional in nature. Moreover, when the structure of the data is not known, as in retained unstructured data archives or repositories, existing database systems cannot be applied.

SUMMARY

A method and system for indexing data is provided. The method includes receiving input from a user defining a classification and an analytic on the data. The method further includes determining a definition of relevance parameters that characterize the classification. Furthermore, the method includes determining relevant data from unstructured and structured data based on the definition of relevance parameters, the relevant data defined by the user as that determined to be relevant to the classification. Moreover, the method includes analyzing the relevant data from unstructured data and structured data based on the relevance parameters to determine terms in the relevant data. Finally, the method generates an index of the attributes, including text based terms, image attribute terms, and the like. From the relevant data after its analysis, the index is useable by an analytics tool to provide results for queries of the unstructured data and structured data.

DETAILED DESCRIPTION OF EMBODIMENTS

Figure 1:
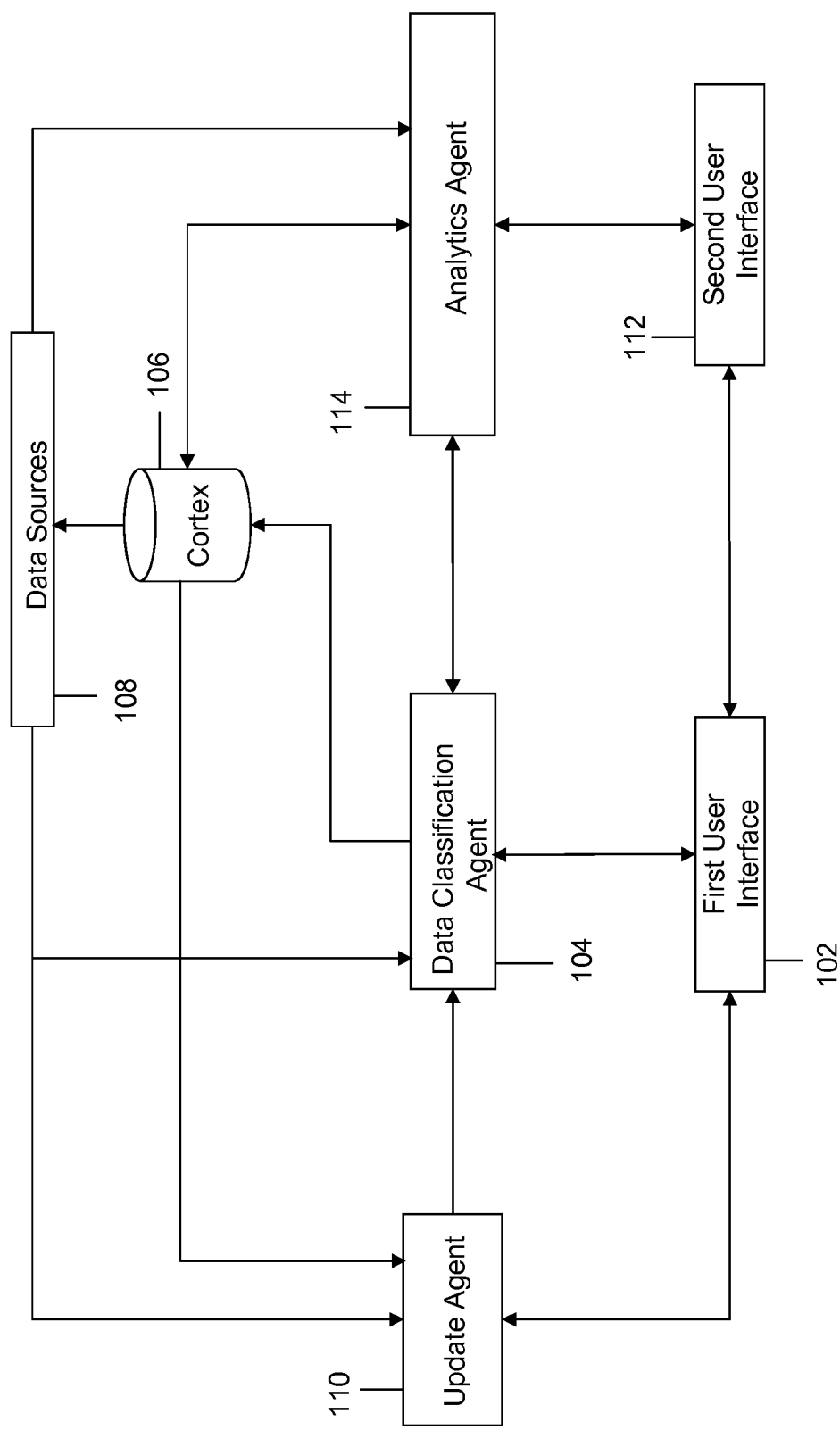
FIG. 1 illustrates a system within which various embodiments may be practiced, for the data classification, indexed data storage process, data retrieval process and application analytics and related quantitative metrics, in accordance with an embodiment.

Generally, certain embodiments of the present disclosure include are configured to analyze primary data and other electronic information in a computer network. For instance, certain embodiments create a database or index of information that describes certain pertinent or relevant aspects of the primary data that allow a user or a system process to consult the database to obtain information regarding the primary data. For example, a data collection agent traverses a network file system and obtains certain characteristics and other attributes of primary data in the network file system. In some embodiments, such a database is a collection of metadata and other information regarding the primary data and is referred to herein as a "Cortex." Generally, the metadata refers to data or information about primary data, and includes but is not limited to, data relating to storage operations, storage management, and retrieval operation, including but not limited to data locations, storage management components associated with data, storage devices used in performing storage operations, indexed data, data application type, or combinations of the same.

Particular embodiments define classifications that are used to determine relevant data for the classifications. The relevant data is indexed for the classification. When using a large database of structured and unstructured data, querying for pertinent results in the entire database may not be efficient. Also, unstructured data is not defined and hard to search if not indexed. Particular embodiments thus allow classifications to be generated that index relevant data including unstructured data, and allow an analytic tool to perform queries on the relevant data in a classification.

In one embodiment, input is received from a user defining a classification and an analytic for the classification. Multiple classifications and analytics may be defined by a user. A definition of relevance parameters is determined that characterize the classification and a set of analytics measures associated with the analytic. The definition may be for the classification. Unstructured data and structured data are analyzed based on the definition of the relevance parameters to determine relevant data in the unstructured data and the structured data. The relevant data being data that is determined to be relevant to the classification defined by the user. An index of the terms from the relevant data is determined. Also, in one embodiment, the relevant data may be determined using an analytics measure. This customizes the relevant data for an analytic that may be used by the analytic tool. The index is useable by an analytics tool to provide results for queries of the unstructured data and structured data. The query may be used within the classification such that targeted results are provided using the index and the relevant data to the classification. Thus, queries from different classifications may be performed efficiently using data determined to be relevant to the classification. Also, an analytics measure may be used to process the data returned.

FIG. 1 illustrates a system within which various embodiments may be practiced, for the data classification, indexed data storage process, data retrieval process and application analytics and related quantitative metrics, in accordance with an embodiment.

FIG. 1 includes a First User Interface 102, a Data Classification Agent 104, a Cortex 106, a Data Sources 108, an Update Agent 110, a Second User Interface 112 and an Analytics Agent 114. The various elements within FIG. 1 are connected using a variety of techniques known to those skilled in the art. In an embodiment, techniques include but are not limited to at least one of logical connections, including well known network topologies, wired connections including but not limited to CAT5 cabling, telephone lines, data bus and the like, wireless connections including but not limited to Bluetooth, WiFi, WiMax, UWB radio, and the like.

The First User Interface 102 interacts with the Data Classification Agent 104 and populates the Cortex 106 with indexed data related to primary data from the Data Sources 108. The information from the Data Sources 108 is analyzed by a machine learning engine and a set of indexed data is created. The machine learning engine is software which employs means for deterministic learning and rule based classifications to produce indexed data relating to primary data from the Data Sources 108. Subsequently, the set of indexed data is stored in the Cortex 106. The Data Classification Agent 104 categorizes information to be stored as indexed data in the Cortex 106.

The Data Classification Agent 104 performs classification on the information from the Data Sources 108 using a number of techniques such as pre-defined rules, machine learning techniques, and the like. The Data Classification Agent 104 is an adaptive software which formulates classification rules from user input for a set of sample information and performs subsequent classification on the information from Data Sources 108 automatically. A person skilled in the art will appreciate that the Data Classification Agent 104 can work in conjugation with various software used to extract and convert data from and to various formats. Examples of such software include but are not limited to Audio Transcription software, Optical Character Recognition software, Language translation software, Encryption/Decryption software, Office Automation Software, and the like.

In an embodiment, the Data Classification Agent 104 is used to categorize a large number of Data Sources 108 containing pictures using user defined classification for a sample set of pictures. In an alternate embodiment, the Data Classification Agent 104 might use image recognition techniques to categorize images not having associated indexed data.

The Cortex 106 is a database which stores indexed data relating to the classification of the Data Sources 108 and allows a user or a process to obtain information included in the Data Sources 108. In an embodiment, the user accesses the information included in the Data Sources 108 via classifications and other indexed data included in the Cortex 106 rather than iteratively analyze all information from the Data Sources 108. This significantly reduces the amount of time required to obtain information and allows for retrieval of unstructured data using the indexed data from the Cortex 106. The unstructured data is data which is not inherently classified or integrated. This is opposed to structured data, which is data that is formatted according to certain specifications. Furthermore, the Cortex 106 reduces load on network resources in accessing information from the Data Sources 108.

The Cortex 106 includes metadata, content, access rights, and classes. The metadata is indexed data containing information about primary data obtained from the Data Sources 108. In an embodiment, the content stores the location of the Data Sources 108. In an embodiment, the access rights store information about authorized users allowed to access the Data Sources 108.

In an embodiment the Data Sources 108 is a storage unit containing at least one source of data. Each of the Data Sources 108 is a collection of information units stored in a manner known to those skilled in the art. In an embodiment the Data Sources 108 include but are not limited to, internet links, fileservers, news reports, sound recordings, pictorial representations, text files, and the like.

In an embodiment, the First User Interface 102 and the Second User Interface 112 are deployed on a Data Processing Unit. In an embodiment, the Data Processing Unit includes but is not limited to a client computer, remote server computers and a network. In a further embodiment, the network represents any of a wide variety of conventional data communications networks. The network includes public portions (e.g., the Internet) as well as private portions (e.g., an internal corporate Local Area Network (LAN) or a home network), as well as combinations of public and private portions. In another embodiment, the network may be implemented using any one or more of a wide variety of conventional communications media including both wired and wireless media. Any of a wide variety of communications protocols can be used to communicate data via network, including both public and proprietary protocols. Examples of such protocols include ZModem, IP, TCP/IP, and the like.

The First User Interface 102 and the Second User Interface 112 are means of interacting with the user. People skilled in the art will appreciate that by the nature of these interfaces, they are dynamic and contain elements for user interaction including but not limited to, check boxes, buttons, text input fields, windowing controls and the like.

The First User Interface 102 allows a user to specify classifications and the Data Sources 108. In another embodiment the First User Interface 102 allows the user to provide rules allowing for the machine learning engine to classify primary data from the Data Sources 108. The rules for the machine learning engine can be derived from user interaction, including but not limited to allowing a user to classify sample information. In another embodiment the First User Interface 102 allows a user to define additional data sources to be added to the Data Sources 108.

The Second User Interface 112 allows for application of analytics and related quantitative metrics on information from the Data Sources 108. The Second User Interface 112 allows the user to specify analytics and related quantitative metrics. In an embodiment the analytics and related quantitative metrics include at least one of Key Performance Indicators (KPI) or Key Performance Metrics (KPM), well known to those skilled in the art, which can be applied on information from Data Sources 108. In an embodiment the Second User Interface 112 also allows the user to define data sources to be added to the Data Sources 108. As previously defined the Data Sources 108 includes at least one of, internet links, fileservers, news reports, sound recordings, pictorial representations, text files, and the like.

The First User Interface 102 interacts with the Data Classification Agent 104 in classifying and indexing primary data contained in the Data Sources 108 into the Cortex 106. In an embodiment, the primary data contained in the Data Sources 108 is at least one of structured data, or unstructured data. According, to an embodiment, structured data is data that is structured in at least one database or in a labeled format. Other examples include but are not limited to database entries, results of computations and derivations, and the like. In another embodiment, the primary data contained in the Data Sources 108 is at least one of unstructured data such as data contained in emails, voice recordings and the like. The Unstructured data may include at least one of free text data or image data that are not "structured" in the manner explained above. Unstructured data includes data that has not been defined by terms or labels. Unstructured data such as free text data can be transformed into structured data by extracting "fields" such as "Names," "Date of Publication," "References", locations, and the like. Unstructured data includes but is not limited to published articles, corporate reports, business communications, blogs, e-mail logs, web pages, meeting notes, and the like.

The First User Interface 102 provides information to the Data Classification Agent 104 regarding the classification and indexing of the Data Sources 108. In an embodiment the information provided are at least one of common factors between the primary data, related information between the primary data, additional data, such as but not limited to file size information, date of creation, relating to the primary data. The Data Classification Agent 104 processes the information provided by the First User Interface 102 and provides feedback on the processed information to the First User Interface 102. The Data Classification Agent 104 further receives information from Data Sources 108 for classification and indexing. The Data Classification Agent 104 classifies and indexes information from the Data Sources 108 and directs the indexed information to the Cortex 106.

The First User Interface 102 further interacts with the Update Agent 110 which receives information from the Data Sources 108. The Update Agent 110 periodically obtains information from Data Sources 108 and directs it to be classified to the Data Classification Agent 104.

The Update Agent 114 implements versioning of the Data Sources 108. Through the implementation of versioning, the Update Agent 114 facilitates the identification, preservation, and retrieval of particular revisions in the lifecycle of the Data Sources 108. The Update Agent 114 is responsible for management and updating of creation, modification, Timestamp of metadata and the Data Sources 108.

The Update Agent 114 compares the Timestamp of indexed data stored in the Cortex 106 and the Timestamp of the primary data from the Data Sources 108. Timestamp of the primary data is obtained from the Data Sources 108, and has features similar to the ones described in the preceding paragraph. Initially the Update Agent 114 retrieves primary data from the Data Sources 108 which has a Timestamp greater than the Timestamp associated with the indexed data. These primary data are referred to as updated data. Subsequently, the updated data are directed to the Data Classification Agent 104 for classification and creation of indexed data. Finally, the Cortex 106 is updated with the indexed data.

The Update Agent 114 fetches primary data from the Data Sources 108 from time to time. In an embodiment, the period of action for the Update Agent 114 is defined by the user. In another embodiment the Update Agent 114 acts from time to time. In another embodiment the Update Agent 114 directs the updated data to the Data Classification Agent 104. The Update Agent 114 forwards a request from the First User Interface 102 to the Data Classification Agent 104 for processing the request.

In an embodiment, the Update Agent 114 is a part of the Data Classification Agent 104. All the steps of fetching primary data from the Data Sources 108 and comparing Timestamps are carried out by the Data Classification Agent 108 in this embodiment. However a person skilled in the art will recognize this as being a feature of software in general and the invention may be practiced without any loss of functionality in this manner.

The Second User Interface 112 interacts with the Analytics Agent 114 for receiving information based on search queries, retrieving information and analytics and related quantitative metrics on primary data from the Data Sources 108. The Analytics Agent 114 carries out various computations and quantitative metrics on primary data and indexed data. Quantitative metrics are a system of parameters for quantitative and periodic usage for information retrieval of a source.

In an embodiment, the Analytics Agent 114 performs quantitative metrics on the primary data from the Data Sources 108. The Second User Interface 112 additionally interacts with the Analytics Agent 114 and allows query input. In an embodiment, the Analytics Agent 114 extracts indexed data from the Cortex 106, regarding the primary data from the Data Sources 108. The Analytics Agent 114 further processes the indexed data received from the Cortex 106 by retrieving relevant primary data from the Data Sources 108, so as to infer information to respond to the queries to the Second User Interface 112. Examples of quantitative metrics would include at least one of modeling financial data, assessing company patent portfolio's, tracking rise and fall in equities, quantizing positive and negative mentions in the course of recorded conversation such as a quarterly analyst conference, and the like. A person skilled in the art will appreciate the need to couple various software programs with the Analytics Agent 114 in order to carry out one or more of the above. Examples of such programs include, but are not limited to using natural language processing, statistical correlation, regression analysis, etc.

The user enters the query via the Second User Interface 112 to retrieve the primary data the Data Sources 108 based on analytics. The query is directed by the Second User Interface 112 to the Analytics Agent 114. The Analytics Agent 114 analyses the query to extract the parameters. In an embodiment the query contains classes for which the primary data from the Data Sources 108 has to be retrieved. The Analytics Agent 114 extracts the classes from the query. The Analytics Agent 114 directs the classes to the Cortex 106 to extract the locations of the primary data which are classified and indexed under the class stored in the Cortex 106. The Analytics Agent 114 retrieves the primary data from the Data Sources 108 for the locations. The primary data retrieved are indexed in the Cortex 106 under the classes for which the user has the query. In another embodiment the query contains classes and the keywords.

The interaction of the various system elements of FIG. 1 taken in conjugation or part are used to carry out the tasks of generating indexed data, storing the indexed data into Cortex 106. Further aspects of the system defined in FIG. 1 allow for application of analytics and related quantitative metrics on the primary data from the Data Sources 108 using the indexed data stored in the Cortex 106. The application of analytics and related quantitative metrics is carried out to derive meaning from the primary data present in the Data Sources 108. The meaning is derived based on a series of computational steps carried out using rules and parameters as defined in later figures.

The system as defined in FIG. 1 additionally updates the indexed data stored in the Cortex 106, by applying rules as described above.

In an embodiment, the First User Interface 102 and the Second User Interface 112 form a single user interface. The single user interface performs the classification of primary data obtained from the Data Source 108, updating operation, analytics and related quantitative metrics on the primary data from the Data Sources 108.

In an embodiment, the First User Interface 102 and the Second User Interface 112 are non-interacting. In another embodiment the First User Interface 102 is accessed by a general user of the system, the Second User Interface 112 is accessed by an administrative user, wherein the types of users are as understood to one ordinarily skilled in the art.

Figure 2:
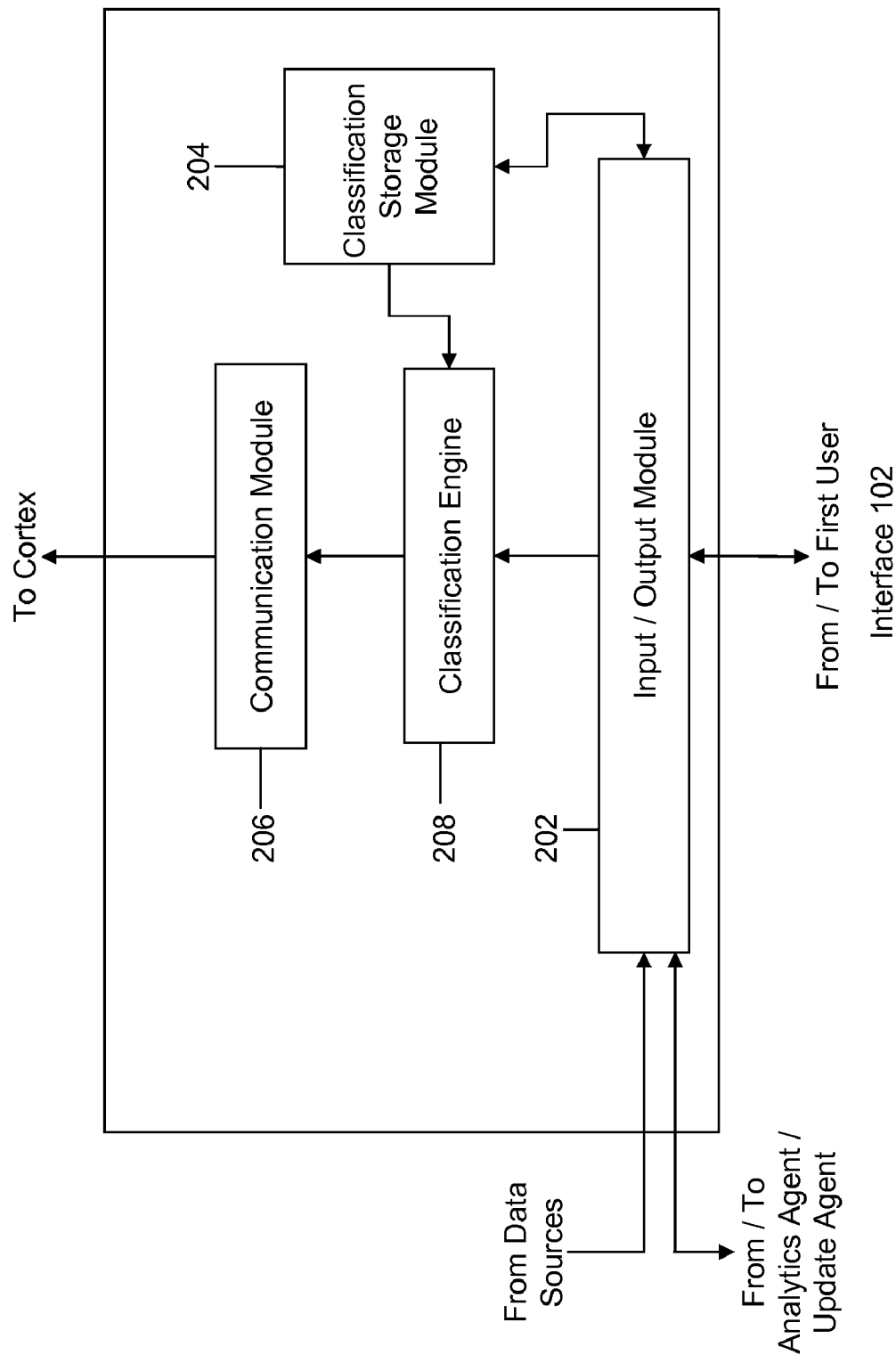
FIG. 2 illustrates the set up of a system for classifying primary data in accordance with an embodiment.

FIG. 2 illustrates the set up of Data Classification Agent 104. The Data Classification Agent 104 includes an Input/Output Module 202, a Classification Storage Module 204, a Communication Module 206, and a Classification Engine 208. The First User Interface 102 interacts with the Input/Output Module 202 for classifying the Data Sources 108. Input/Output Modules, contains Input/Output Module 202, which allows for methods of inputting information into computational devices, such as, but not limited to, keyboard devices, pointing devices, radio control devices, telephony instruments, and the like.

Information related to the rules of classification of primary data from the Data Sources 108, categorized by the First User Interface 102 is directed by the Input/Output Module 202 to the Classification Storage Module 204. The information related to the rules of classification of the Data Sources 108 is directed from the Classification Storage Module 204 to the Classification Engine 208 at the time of the classification of the Data Sources 108. Input/Output Module 202 receives primary data from the Data Sources 108. Subsequently the primary data from the Data Sources 108 is directed to the Classification engine 208. The Classification Engine 208 applies rules of classification to the Data Sources 108, using deterministic techniques, which are described in more detail below. The Classification Engine 208 produces indexed data in this manner. Subsequently the indexed data is directed to the Communication Module 206.

The Communication Module 206 directs the indexed data to the Cortex 106 for storage. Information related to the rules of classification is also directed from the Classification Storage Module 204 to the Input/Output Module 202 which in turn directs the information to the Analytics Agent 114. The Update Agent 110 also interacts with the Input/Output Module 202 for the classification of primary data from the Data Sources 108 which is passed to the Classification Engine 208.

Figure 3:
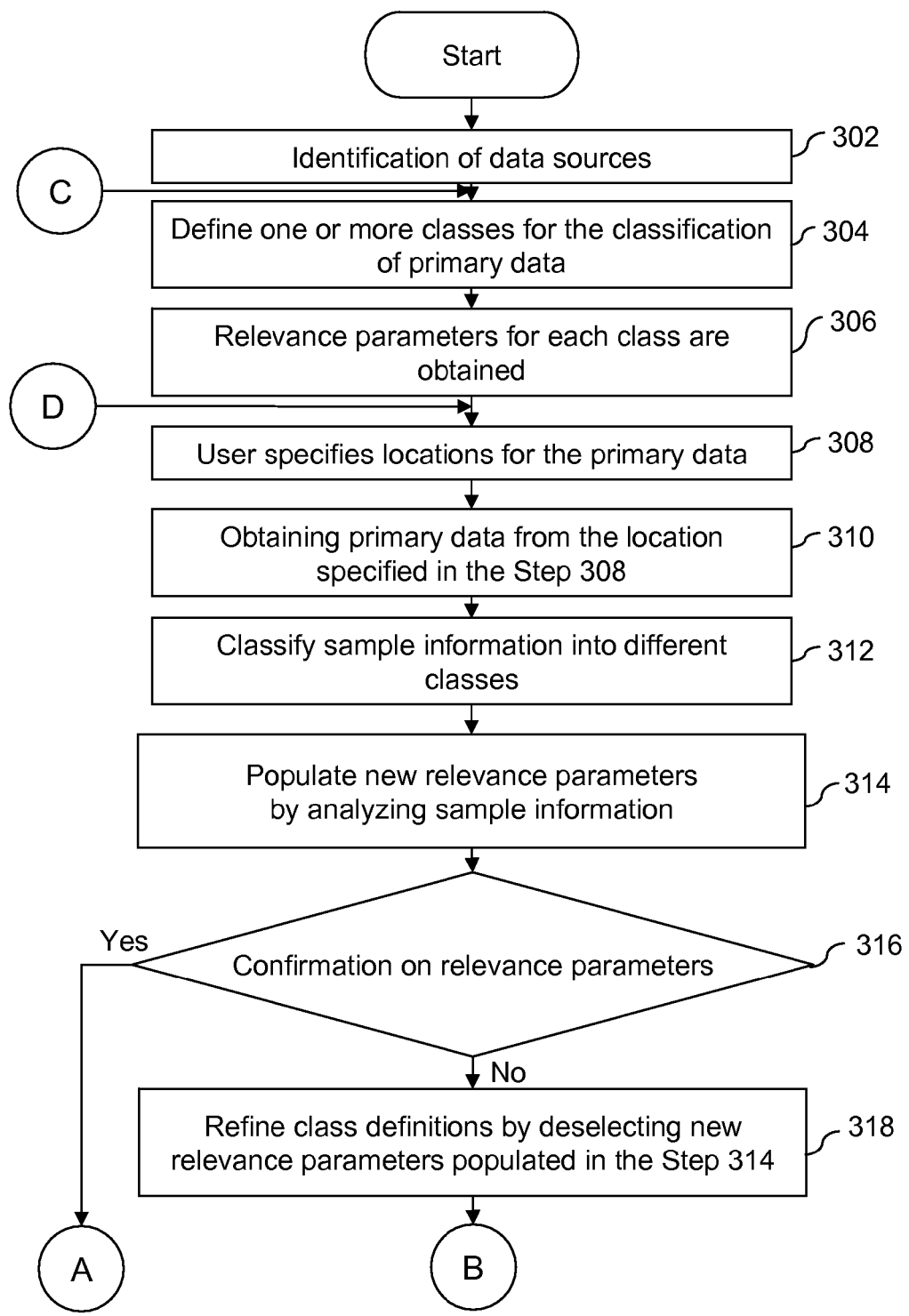
FIG. 3a and FIG. 3b illustrates a flowchart depicting a method for classification and indexing, in accordance with an embodiment.
Figure 3:
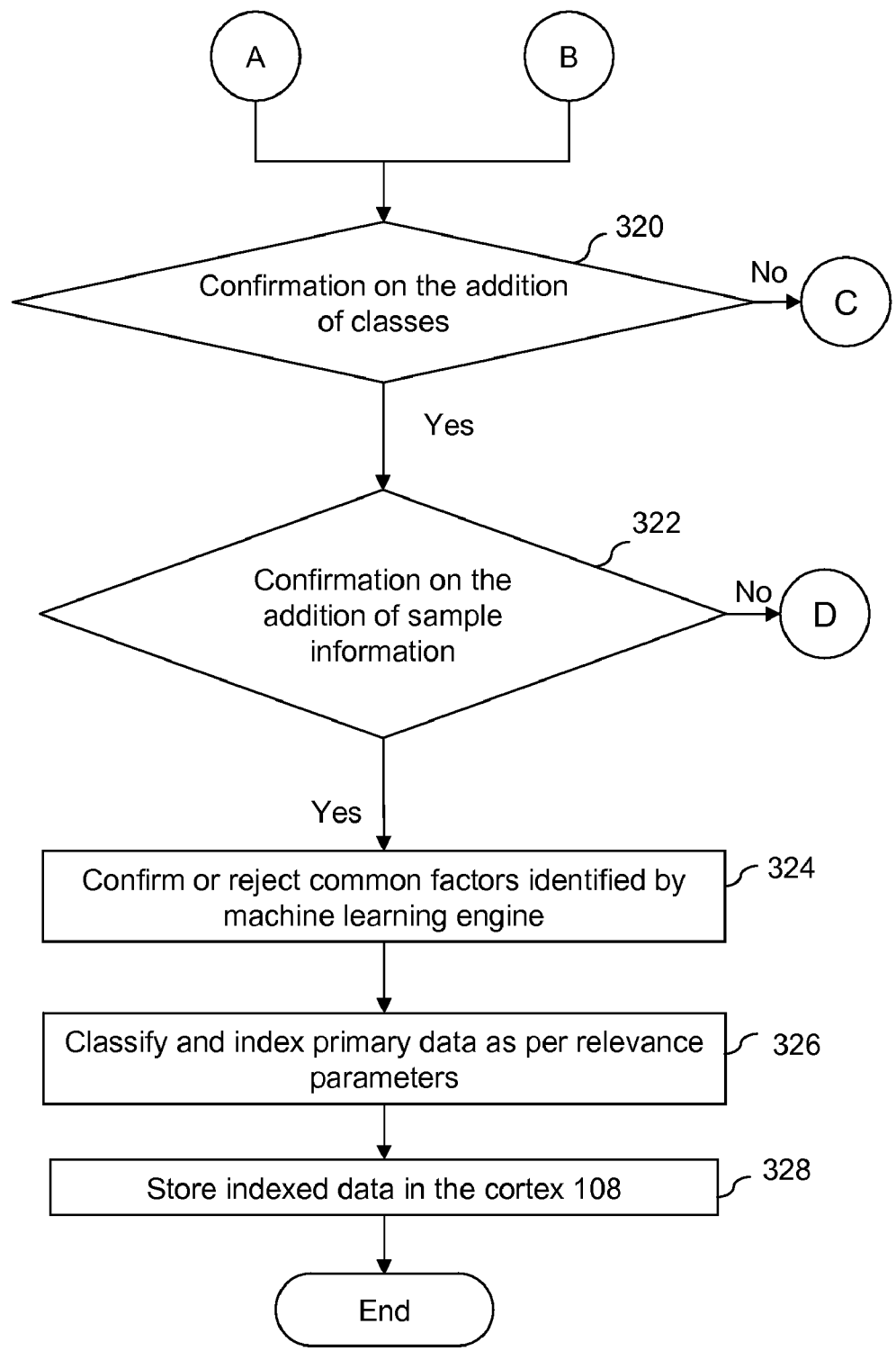

FIG. 3a and FIG. 3b illustrates a flowchart depicting a method for the classification and indexing of the Data Sources 108, in accordance with various embodiments. At Step 302, the First User Interface 102 receives input that selects the Data Sources 108 from which primary data is to be obtained. At Step 304, one or more classes are defined for classifying the primary data from the Data Sources 108 selected in the Step 302. In an embodiment, the classes are the different sections in which any type of Data Sources 108 selected can be broadly classified.

At Step 306, relevance parameters for each class, as defined in Step 304 are obtained. The relevance parameters for the particular class are keywords, phrases and text which are present in the Data Sources 108. The relevance parameters may also be determined based on an analytic measure that may be used by an analytic tool. At Step 308, the user specifies a plurality of locations for the primary data. In an embodiment, all the locations of the Data Sources 108 are selected.

In an embodiment, at Step 310, primary data is obtained from the Data Source 108 from locations defined in Step 308. The primary data obtained from the Data Sources 108 is referred to as sample information. In an embodiment the sample information is obtained in a random manner by the Data Classification Agent 104. At Step 312, the sample information is classified into different classes. In an embodiment, the classification is carried out by the user. At Step 314, the Data Classification Agent 104 populates new relevance parameters for different classes based on the classification of the sample information as carried out in the Step 310. At Step 316, confirmation on the new relevance parameters is obtained.

At Step 318, the class definitions can be refined by deselecting new relevance parameters populated in the Step 314. At Step 320, the system obtains confirmation on further addition of the classes. If further, class definitions have to be added, the Step 304 is executed. In case further classification is not required, Step 322 is executed. At Step 322, confirmation on the addition of the sample information is obtained. In case the sample information is added, the Step 308 is executed. In case sample information is not added Step 324 is executed. At Step 324, the common factors automatically generated by the machine learning engine are confirmed or rejected to refine the class definition. The primary data from the Data Sources 108 is classified and indexed into different classes using classification methods that use the relevance parameters determined from the Step 326. At Step 328, the classified and indexed data is stored in the Cortex 106.

The process of indexing as indicated above is a manner of generating information related to existing data. This information includes but is not limited to time and date stamps, file size information, geo-location information, related information represented by user generated terms and phrases and the like.

Figure 4:
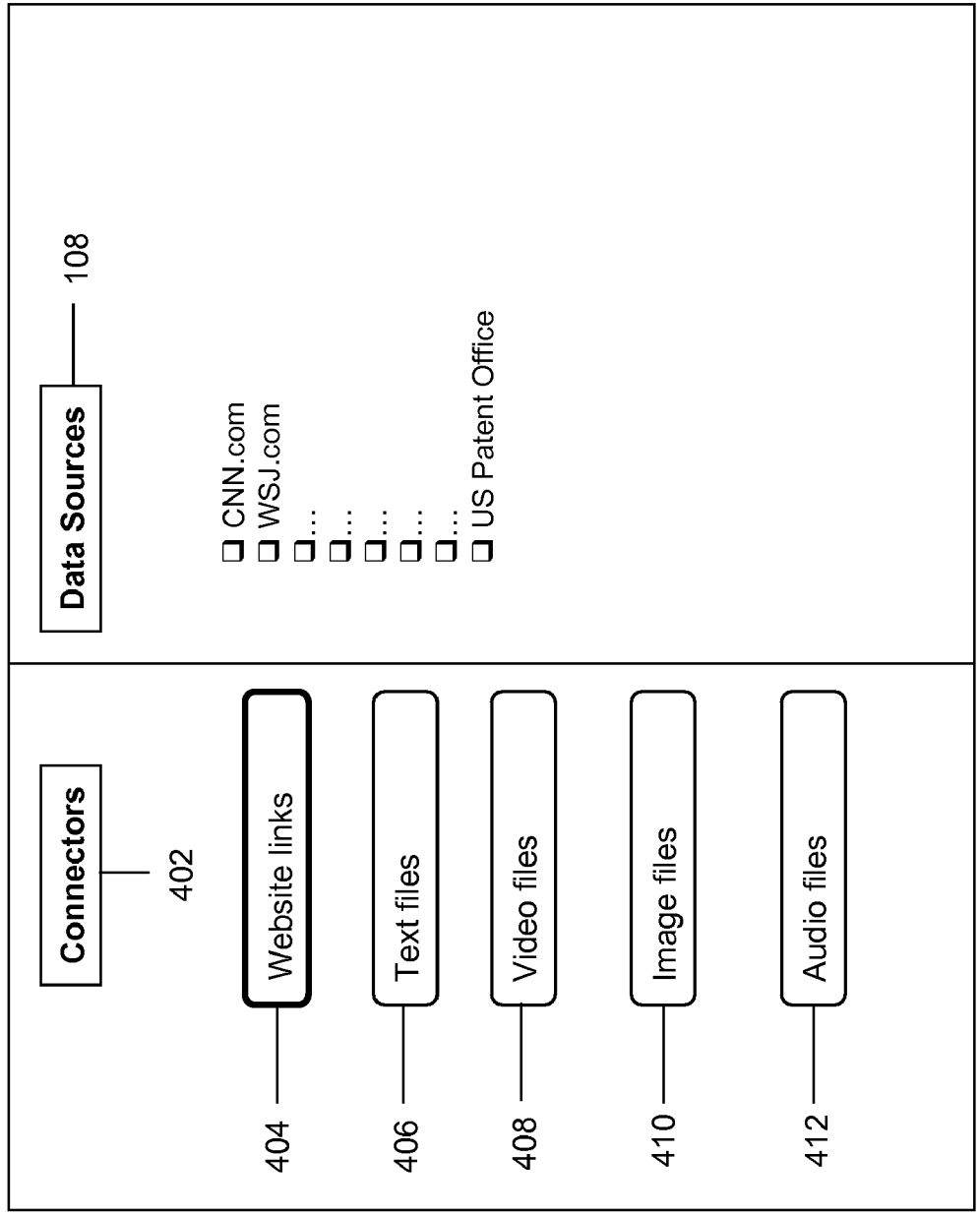
FIG. 4 illustrates an exemplary embodiment of a user interface for identification of data sources.

FIG. 4 illustrates an exemplary embodiment of a user interface for identification of Data Sources. FIG. 4 illustrates the First User Interface 102 in which various embodiments may be practiced. The First User Interface 102 is accessed by a user for the identification of the Data Sources 108, and indicates selected Connector 404 and types of Connectors 402 in accordance with various embodiments. The First User Interface 102 includes Connectors 402 and Data Sources 108. The Connectors 402 are used in the First User Interface 102 for displaying the list of Data Sources 108 associated with the Connector 402. The Connectors 402 is a data link which connects a system to the Data Sources 108 for identification. In an embodiment, the Connectors 402 connects a system to the Data Sources 108 and scans the Data Sources 108 for primary data.

In an embodiment, the Connectors 402 is a representation of the data types contained within Cortex 106. In an embodiment, the Connectors 402 is an icon motif of the type well known in the art. In an embodiment the Connectors 402 is a tab element containing text identifiers relating to information types present within the Data Sources 108. In a further embodiment the Connectors 402 is specified by a user. In another embodiment the Connectors 402 is defined by the Data Classification Agent 104. The Connectors 402 in an exemplary embodiment are shown to be Website links 404, Text files 406, Video files 408, Image files 410, and Audio files 412. The Internet links 404 represent Internet-based information from the Data Sources 108.

The Text files 406 represents at least one text based data file from the Data Sources 108 known in the art. The Video files 408 represents at least one encoded dynamic visual representation from the Data Sources 108 of the type well known in the art. The Image files 410 represents static or animated images from the Data Sources 108 of the type well known in the art. The Audio files 412 represent voice recorded from the Data Sources 108 of the type well known in the art.

A person skilled in the art will appreciate that the various types of files and the data contained within them are representational in nature, and may be further explained as being encoded in various formats and be parts of various groupings. The Image files 108 for instance may be of various types including but not limited to bitmap files, JPEG files, Portable Network Graphics files, and the like. Each of these specific types of files may carry additional information about aspects such as Creation Date, Creator, File Size, and the like. It will also be appreciated by a person of skill in the art that such information will be unique to each file type and the kind of additional data stored with each file type will be unique. Further, multimedia files such as presentations incorporating elements such as videos, text, images and animations will have specific information associated with each of these elements, while also including information about the multimedia file overall.

Figure 5:
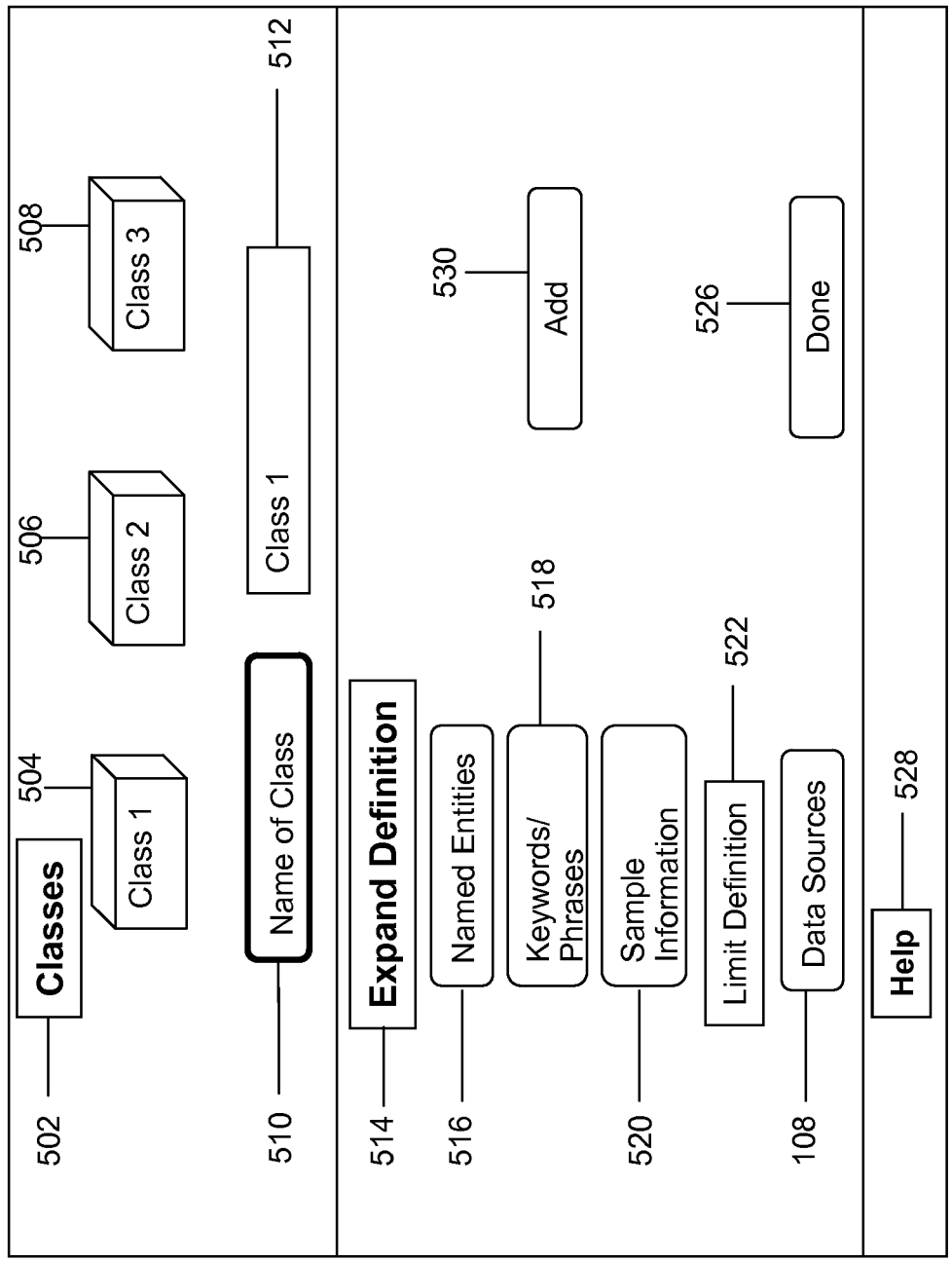
FIG. 5 illustrates an exemplary embodiment of a user interface for classification and indexing.

FIG. 5 illustrates an exemplary embodiment in which a user accesses the First User Interface 102 to set up Classes 502 with relevant definitions. Three classes have been defined by the user as class 1 in the Text Box 504, class 2 in the Text Box 506, class 3 in the Text Box 508. A Text Box 510 and Text Box 512 displays the name for the class currently selected.

The user after defining the classes is provided with the option to expand Definition 514 by defining Named Entities 516, Keywords/Phrases 518, and Sample Information 520. The Definition 514 represents relevant key words or phrases important for classification in the case of text based data. The Sample Information 520 represents examples of data that represent a data class. The Named Entities 516 and the Keywords/Phrases 518 represent indexed data to be stored within the Cortex 106. The user defines the Named Entities 516 by adding the relevant information after selecting the Named Entities 516. The user further, defines the Keywords/Phrases 518 which are relevant to the class selected. In an embodiment the user is also given the option of selecting semantic variants of the Keywords/Phrases 518. These semantic variants are obtained via thesaurus tools such as Word Net™, Thesaurus.com™ and the like. In another embodiment, the Definition 514 is obtained automatically using data discovery and processing techniques known in the art. Add Button 530 is available for the user to create a plurality of keywords or phrases. In an embodiment the Named Entities 416 are company names. In an embodiment the Keywords/Phrases 518 represent information relating to the Named Entities 516. Examples of the Keywords/Phrases 518 include but are not limited to information such as CEO names, Product names, advertising slogans, competitor information, and the like.

The Sample Information 520 represents information from the Data Sources 108. In an embodiment the location of the Sample Information 520 is provided by the user. In a further embodiment the Sample Information 520 is provided randomly to the user. In an embodiment the user has an option to de-select any of the Sample Information 520. The Add Button 530 is available for the user to add information sources to the Data Sources 108.

The user can limit Definition 522 by selecting the Data Sources 108 to be used for the classification of the information in the class currently selected. A Done Button 526 is provided for the user to confirm the Classes 502 with the definitions. A Help Button 528 is provided to the user for relevant help regarding the First User Interface 102.

The user categorizes the Sample Information 520 into the Class 1, Class 2, and Class 3. After the classification of the Sample Information 520 the user is presented with common factors that characterize a selected class with an option to de-select the common factors which are not relevant to the class definition to further refine or correct the basis of classification. In an embodiment the common factors are at least one of keywords, phrases, image attributes, audio file attributes and the like. The common factors contain the plurality of common factors. In an embodiment the common factors represent combination of keywords/phrases entered by the user and the keywords/phrases generated automatically by the machine learning engine. The machine learning engine adapts to eliminate the need for user intuition in the classification of the Data Sources 108. The user intuition cannot be entirely eliminated since the user of the machine learning engine must specify how the primary data is to be represented and what mechanisms will be used to search for a characterization of the primary data. The machine learning engine can be viewed as an attempt to automate process of classification of the Data Sources 108.

In one embodiment, classification of a personal data of an employee stored in the Data Sources 108 is illustrated. The Data Classification Agent 104 retrieves the primary data that is to be indexed from the Data Sources 108. The information relevant to the pre-defined classes: <first name>, <last name>, <street>, <City>, and <State> is assigned to a set of metadata and is stored in the Cortex 106. In addition, implicit metadata are assigned to the classes <Profession> and <Education> are added with information derived based on the fact that the name may include the salutation of "Dr." In another embodiment, if the Data Classification Agent 104 determined that the information included a business entity, as opposed to an individual, based on the fact that the name included "LLC" which is pre-defined in a class <company name>. Thus, "Joy Cleaners" was assigned to the metadata relevant to the class <company name>. Additionally, information regarding the cleaning/cleaners services provided by the company is also indexed and is assigned to the metadata relevant to the class <services>.

Machine learning helps in extracting information from data automatically, by computational and statistical methods. Examples of machine learning can be but not limited to supervised learning, unsupervised learning, semi-supervised learning, reinforcement learning, transduction, etc. Machine learning can include applications in but are not limited to natural language processing, syntactic pattern recognition, search engines, medical diagnosis, bioinformatics, detecting credit card fraud, stock market analysis, classifying DNA sequences, speech and handwriting recognition, object recognition in computer vision, game playing and robot locomotion.

Figure 6:
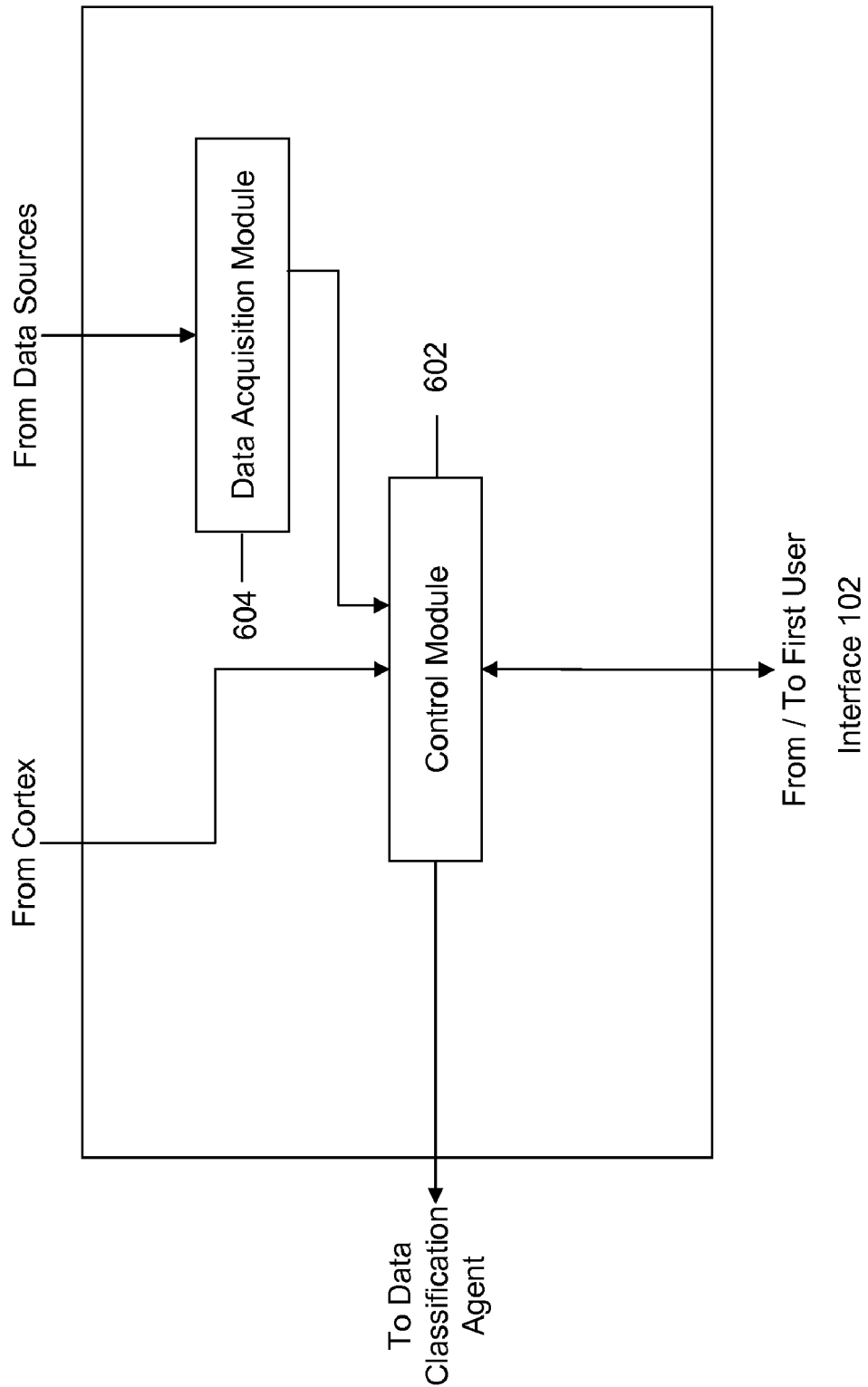
FIG. 6 illustrates the set up of a system for updating indexed data, in accordance with an embodiment.

FIG. 6 illustrates the set up of a system for updating indexed data, in accordance with an embodiment. The system for updating the information is the Update Agent 110. The Update Agent 110 includes a Control Module 602, and a Data Acquisition Module 604. The First User Interface 102 sets up rules for the updating step to be performed. The rules are directed to the Control Module 602. The Data Acquisition Module 604 receives the Timestamp of the primary data from the Data Sources 108 and directs it to the Control Module 602.

The Timestamp of the indexed data is received by the Control Module 602 from the Cortex 106. The Control Module 602 compares the Timestamp of indexed data and the Timestamp of the primary data from the Data Sources 108. The Timestamp of the primary data is greater then the Timestamp of indexed data. The primary data having the greater Timestamp referred previously as updated data is directed to the Data Classification Agent 104 for classification and creation of indexed data.

Figure 7:
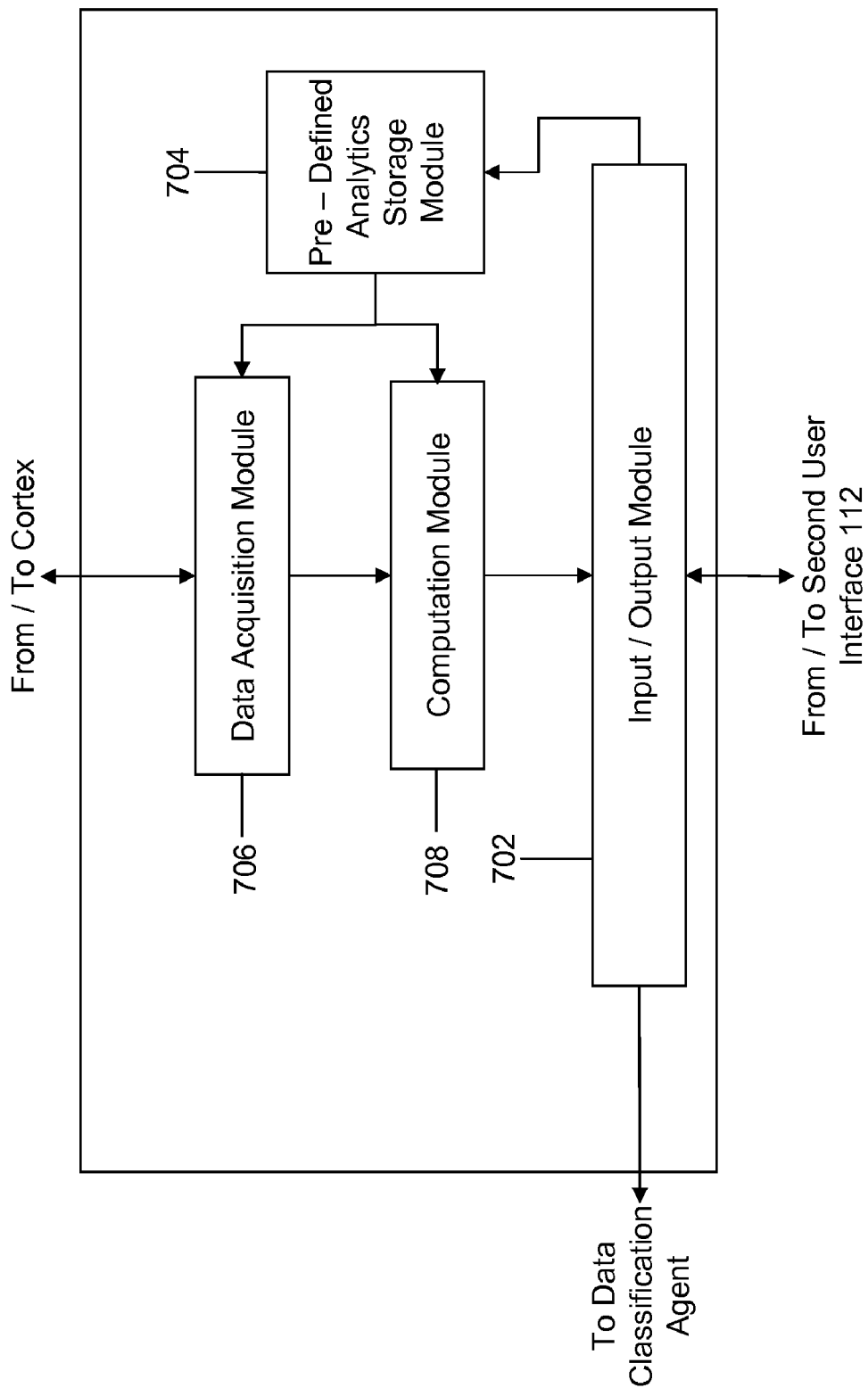
FIG. 7 illustrates the set up of a system for data retrieval, analytics and related quantitative metrics, and computation, in accordance with an embodiment.

FIG. 7 illustrates a system for data retrieval, analytics, computation, in accordance with an embodiment. The system for data retrieval, analytics computation on the Data Sources 108 is the Analytics Agent 114. The Analytics Agent 114 includes an Input/Output Module 702, a Pre-Defined Analytics Storage Module 704, a Data Acquisition Module 706, a Computation Module 708. Interactions between the modules of the Analytics Agent 114 cause primary data from the Data Sources 108 to be computed based on certain inputs or pre-defined analytics and related quantitative metrics. The Input/Output Module 702 interacts with the Second User Interface 112 to receive the queries relating to at least one of information retrieval, analytics and related quantitative metrics, on the Data Sources 108. The Input/Output Module 702 directs queries to the Pre-Defined Analytics Storage Module 704. The query also includes a specification of a class that the query should be run in. The index generated for the class is then used to determine results for the query. The query may be generated more efficiently because the index has been generated for a class that may be relevant to the analytic.

The Pre-Defined Analytics Storage Module 704 contains parameters for the plurality of analytics and related quantitative metrics. Additional metrics may be added to the Pre-Defined Analytics Storage Module 704 by the Second User Interface 112. The Second User Interface 112 sets up a new analytics and related quantitative metrics and directs the parameters for analytics and related quantitative metrics, referred to as the input parameters to the Input/Output Module 702.

The Input/Output Module 702 further directs the input parameters to the Pre-Defined Analytics Storage Module 704 and the parameters will be stored associated with the new analytics and related quantitative metrics. During the processing of the queries related to the analytics and related quantitative metrics, the Pre-Defined Analytics Storage Module 704 interacts with the Data Acquisition Module 706 for directing the input parameters. The Data Acquisition Module 706 interacts with the Cortex 106 to receive primary data from the Data Sources 108 on which the analytics and related quantitative metrics are computed. The primary data received is determined based on the classification being used. The index is used to determine the primary data. The received primary data from the Data Sources 108 and the parameters for the analytics and related quantitative metrics are directed to the Computation Module 708.

The Computation Module 708 applies the analytics and related quantitative metrics on the received primary data from the Data Sources 108 and directs output to the Input/Output Module 702. The Input/Output Module 702 directs the output of the processed queries to the Second User Interface 112. The Input/Output Module 702 directs the queries to the Data Classification Agent 104 in case classes are to be added.

The analytics and related quantitative metrics as indicated above can include but not be limited to such computational elements as data mining, quantitative estimation, search functionality, unformatted data retrieval and the like.

In an embodiment, the Pre-Defined Analytic Storage Module 704 contains at least one of a pre-defined analytics and related quantitative metrics relating to the at least one primary data contained in the Data Sources 108. In another embodiment the pre-defined analytics and related quantitative metrics further contains at least one of keywords, classifications and relevance parameters. In a further embodiment the user is presented with the results of the pre-defined analytics and related quantitative metrics. Results of the analytics and related quantitative metrics are used for decision making such as but not limited to detecting fraud, regression modeling, economic forecasting, valuation of equities, and the like.

In another embodiment, the user defines at least one quantitative metric of an analytic and related quantitative metric. The at least one quantitative metric is defined as a computation carried out on the at least one primary data which matches at least one of the indexed data from the Cortex 106.

Figure 8A:
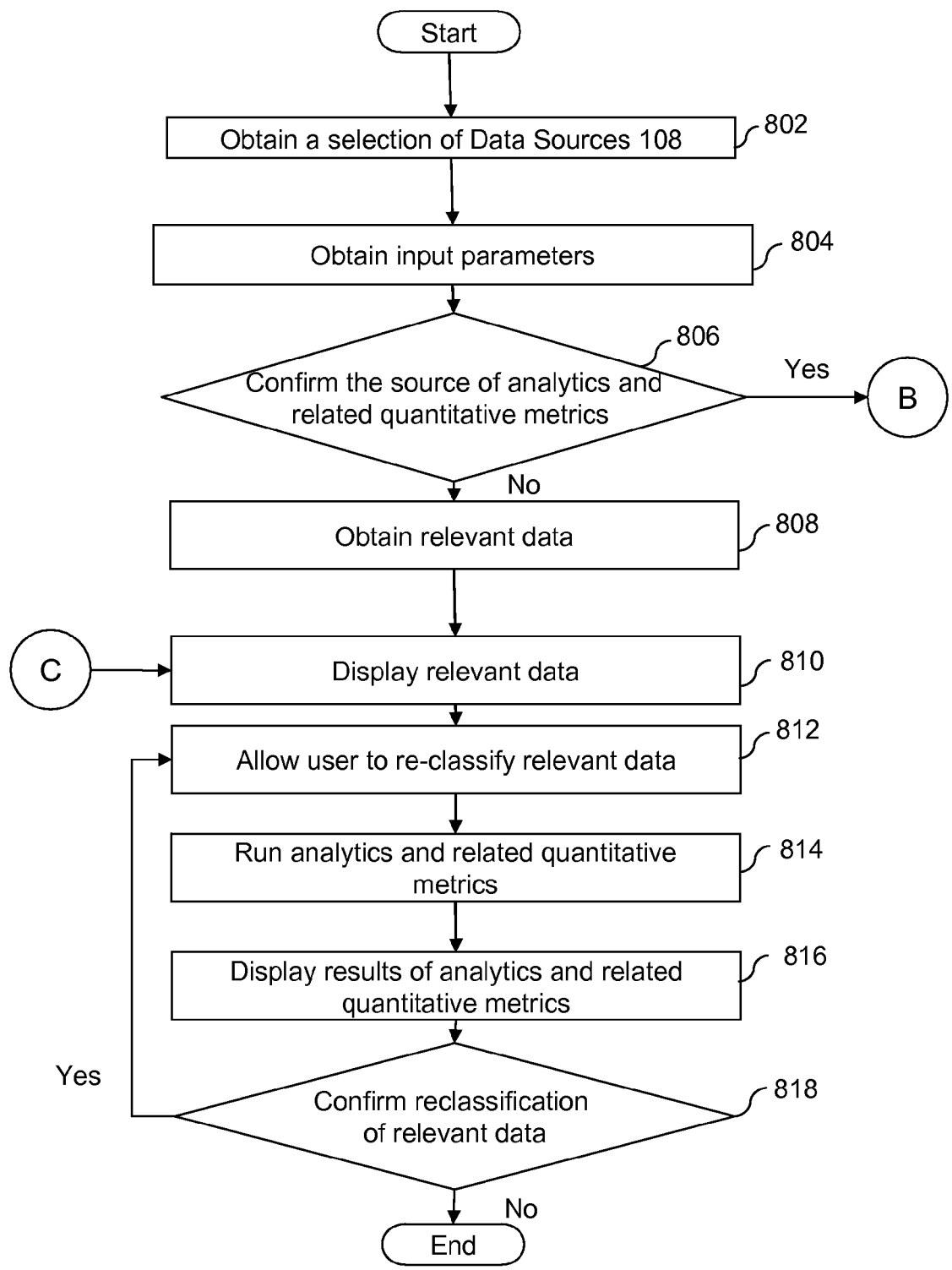
FIG. 8a and FIG. 8b illustrates a flowchart depicting a method for processing of the queries related to the data retrieval and analytics and related quantitative metrics, in accordance with various embodiments.

FIG. 8a and FIG. 8b illustrates a flowchart depicting a method for processing of the queries related to the data retrieval and analytics and related quantitative metrics, in accordance with various embodiments. At Step 802, the Second User Interface 112 receives a selection of the Data Sources 108. The selected Data Sources 108 are the data sources for which a query is requested. The query can be a data retrieval process and the query can be the analytics and related quantitative metrics on the Data Sources 108. At Step 804, the input parameters are received. The input parameters are indexed data which are used to obtain primary data from the Data Sources 108. At Step 806, confirmation on the source of analytics and related quantitative metrics is obtained. The confirmation is obtained in order to carry out a separate series of steps to save a pre-defined analytics and related quantitative metrics as per a user of the system.

If the analytics and related quantitative metrics are user defined, Step 818 is executed. If the analytics and related quantitative metrics are a pre-defined analytics and related quantitative metrics Step 808 is executed. At the Step 808, relevant data from the Data Sources 108 is obtained. The relevant data is data which corresponds to the parameters for the plurality of analytics and related quantitative metrics, including but not limited to, the indexed data from the Cortex 106, and primary data from the Data Sources 108.

At Step 810, the relevant data obtained from the processing of the analytics and related quantitative metrics is displayed to the user. At Step 812, the user is allowed to re-classify the relevant data in additional classifications by providing feedback on the results of the analytics and related quantitative metrics. At Step 814, the analytics and related quantitative metrics is processed on the relevant data. The step of processing the analytics and related quantitative metrics refers to performing computational functions defined in the analytics and related quantitative metrics, including but not limited to performing counts of various parameters, applying algorithms on the relevant data obtained, formatting the primary data from the Data Sources 108, and the like. At Step 816, the relevant data obtained from the processing of the analytics and related quantitative metrics query is displayed to a user.

At Step 818 confirmation is obtained for the reclassification of the relevant data obtained in the Step 810. In case reclassification of the relevant data is required to be carried out the Step 812 is executed. In case reclassification of the relevant data is not required to be carried out the Step 820 is executed.

Figure 8:
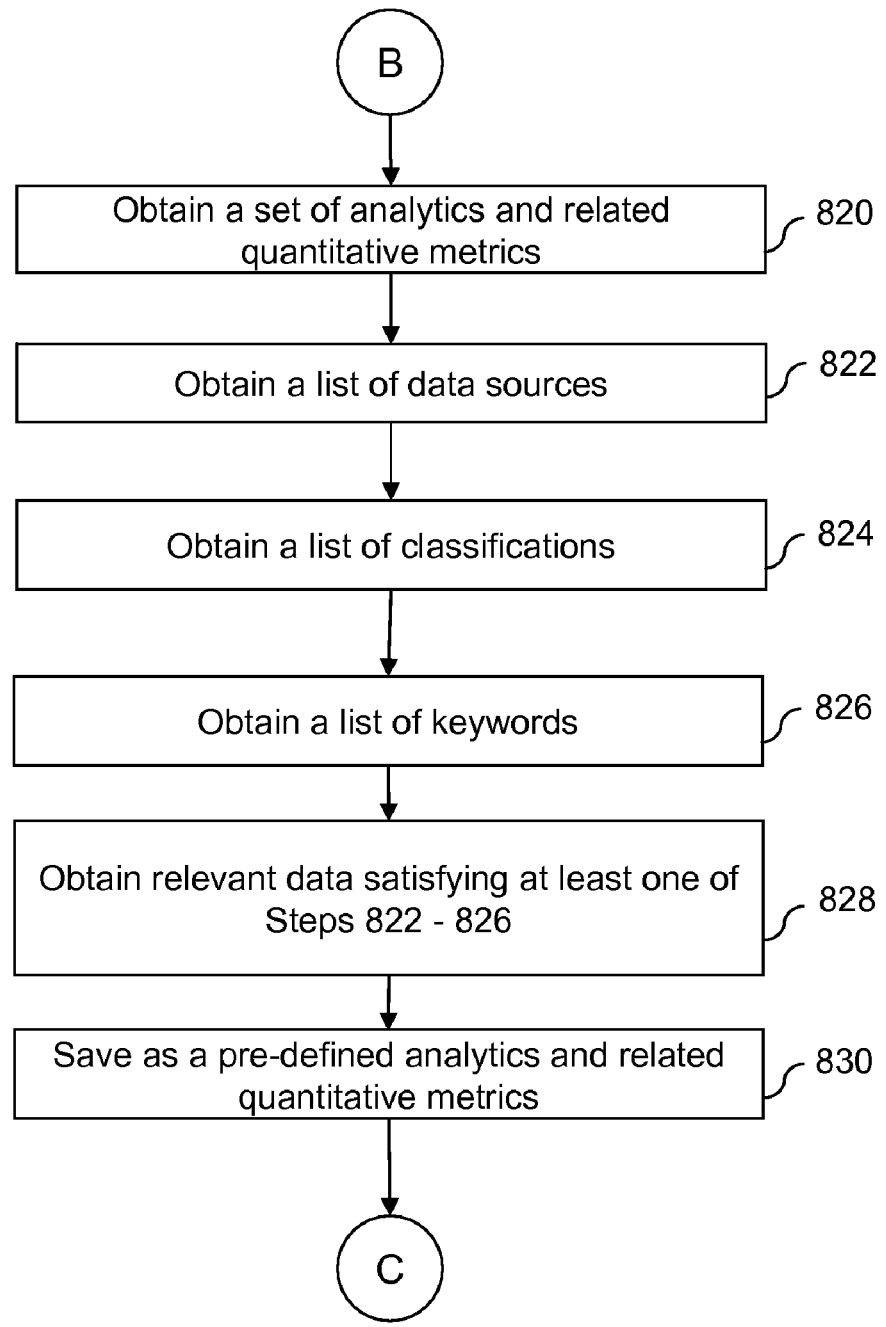

At Step 820, a set of analytics and related quantitative metrics is obtained. At Step 822, the Data Sources 108 for which the analytics and related quantitative metrics are to be executed are indicated. The indicated analytics and related quantitative metrics include at least one computational step. At Step 824, the classification of the Data Sources 108 is performed by a user. At Step 826, a list of keywords is obtained from the user. In an embodiment FIG. 8 may exclude the Step 824 and Step 826. At Step 828, the relevant data satisfying the input of at least one of Steps 822-826 are displayed to the user. At the Step 830, the user defined analytics and related quantitative metrics is stored as the predefined analytics and related quantitative metrics.

Subsequent to the Step 830, the Step 810 is executed and the computational results of the above analytics and related quantitative metrics are displayed to the user.

Figure 9:
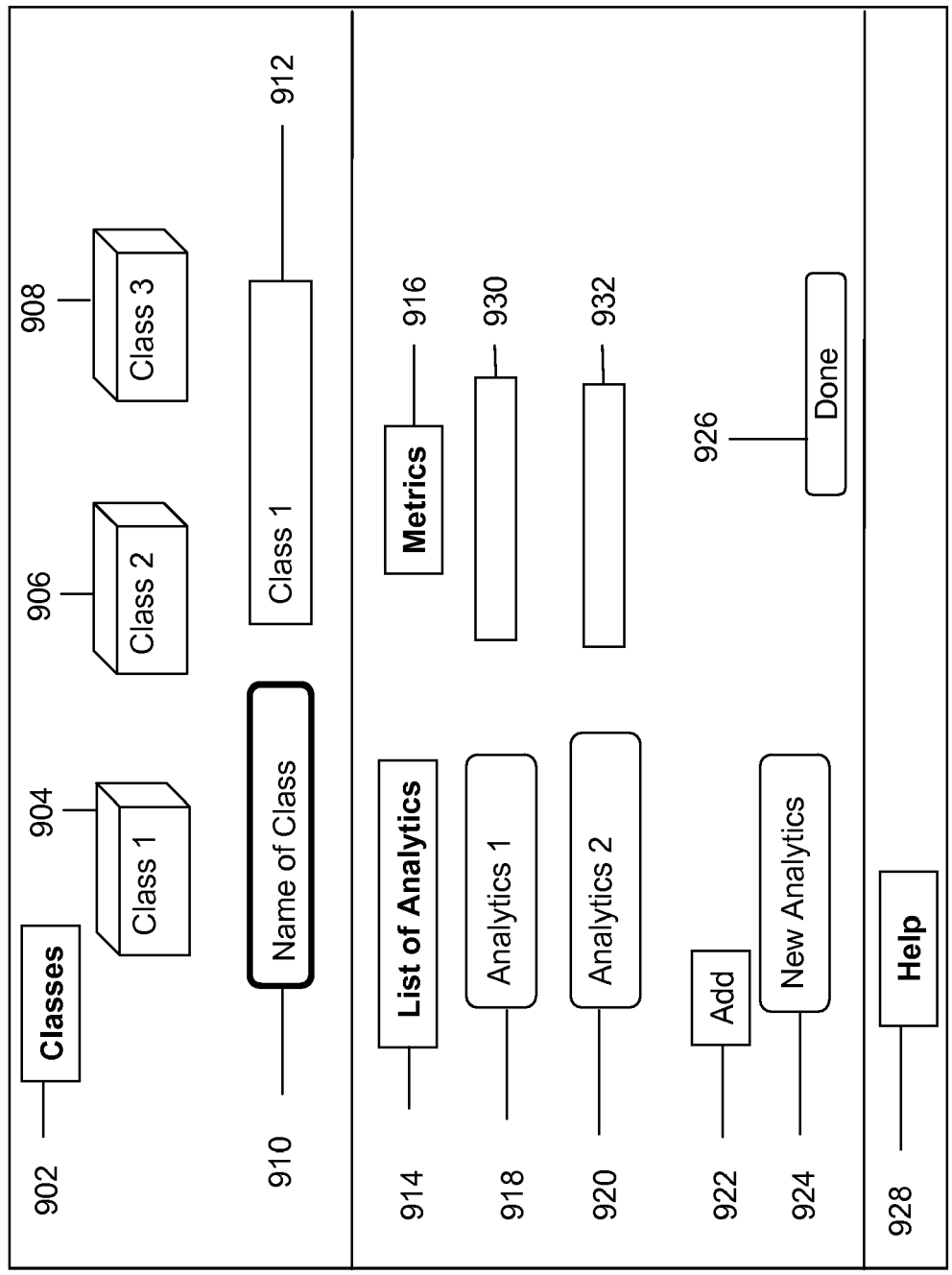
FIG. 9 illustrates an exemplary embodiment of a user interface for setting up of analytics and related quantitative metrics.

FIG. 9 illustrates an exemplary embodiment in which the user accessing the Second User Interface 112 sets up analytics and related quantitative metrics on the primary data obtained from the Data Sources 108. The List of Analytics 914, in this embodiment, includes two defined analytics and related quantitative metrics named as Analytics 1 and Analytics 2 in Text Box 918 and Text Box 920. The Metrics 916 are analytics and related quantitative metrics applied to primary data in the class. In an embodiment the user defines new analytics and related quantitative metrics in a new Analytics Area 924 and selects the Add Button 922 to populate the new analytics and related quantitative metrics to the List of Analytics 914. In a further embodiment, the user indicates completion by selecting a Done Button 926. The Help Button 928 is provided to the user for explanation related to the Second User Interface 112.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

The invention claimed is:

1. A tangible computer-readable medium, storing instructions executed by a computer system to implement a method for indexing data, the instructions comprising:
   instructions for receiving input from a user defining a classification;
   instructions for receiving input from the user defining an analytic for the classification;
   instructions for determining a definition of relevance parameters that characterize the classification;
   instructions for populating a cortex of data in a tangible computer readable database, the cortex of data being populated based on the classification of the data to be indexed;
   instructions for determining, using a processor based machine learning engine, relevant data from the cortex of data based on the definition of relevance parameters, the relevant data being data which is determined to be relevant to the classification defined by the user;
   instructions for analyzing the relevant data from the cortex of data based on the relevance parameters to determine attributes in the relevant data;
   instructions for generating an index of the attributes from the relevant data based on the analyzing of the relevant data;
   instructions for storing the index in the cortex; and
   instructions for receiving a query from an analytics tool, the query specifying the classification and an analytics measure, wherein the index is used by the analytics tool to provide results for the query using the analytics measure as applied to the data in the relevant data indexed in the classification.

2. The tangible computer-readable medium of claim 1, the instructions further comprising instructions for receiving one or more data sources for the classification, wherein data in the one or more data sources is analyzed to determine the relevant data.

3. The tangible computer-readable medium of claim 1, wherein the relevance parameters comprise attributes that are determined to be relevant to defining the classification.

4. The tangible computer-readable medium of claim 1, wherein the relevance parameters are derived from one or more data sources including unstructured data to be searched.

5. The tangible computer-readable medium of claim 1, wherein the relevant data can also include unstructured data and structured data.

6. The tangible computer-readable medium of claim 5, wherein the relevance parameters comprise one or more keywords or phrases associated with the classification, wherein the analyzing comprises searching for the keywords or phrases in the unstructured data and structured data.

7. The tangible computer-readable medium of claim 5, wherein the relevance parameters comprise one or more attributes or feature associated with the classification, wherein the analyzing comprises searching for the non-text data in the unstructured data and structured data.

8. The tangible computer-readable medium of claim 5, wherein the unstructured data comprises text, audio, image or video.

9. The tangible computer-readable medium of claim 1, wherein the analytic measure comprises a subject area to be analyzed.

10. The tangible computer-readable medium of claim 1, wherein the analytics measure comprises a quantitative metric of an analytic.

11. The tangible computer-readable medium of claim 1, the instructions further comprising:
    instructions for receiving a query from the analytics tool;
    instructions for searching the index based on the index attributes;
    instructions for determining a classification for the query;
    instructions for determining relevant data indexed for the classification; and
    instructions for determining a result for the query based on a search of the determined relevant data.

12. The tangible computer-readable medium of claim 1, wherein the analytics tool further processes the result using the analytic measure.

13. The tangible computer-readable medium of claim 1, the instructions further comprising:
    instructions for determining feedback based on the results determined; and
    instructions for modifying the classification and the index based on the feedback.

14. The tangible computer-readable medium of claim 1, wherein the index is created for use by an entity running the analytics tool.

15. A system for indexing data comprising:
    one or more processors; and
    logic encoded in one or more tangible media for execution by the one or more processors and when executed operable to:
        receive input from a user defining a classification and an analytic for the classification;
        determine a definition of relevance parameters that characterize the classification;
        determine relevant data from unstructured or structured data based on the definition of relevance parameters, the relevant data being data that is determined to be relevant to the classification defined by the user;
        analyze the relevant data from unstructured data and structured data based on the relevance parameters to determine attributes in the relevant data;
        generate an index of the attributes from the relevant data based on the analyzing of the relevant data; and
        receive a query from an analytics tool, the query specifying the classification and an analytics measure, wherein the index useable by an analytics tool to provide results for the query using the analytics measure applied to the unstructured data and structured data in the relevant data indexed in the classification.

16. The system of claim 15, wherein the relevance parameters comprise one or more keywords or phrases associated with the classification, wherein the analyzing comprises searching for the keywords or phrases in the unstructured data or structured data.

17. The system of claim 15, wherein the relevance parameters comprise one or more attributes or feature associated with the classification, wherein the analyzing comprises searching for the non-text data in the unstructured data or structured data.

18. The system of claim 15, wherein the logic is further operable to:
    receive a query from the analytics tool;
    search the index based on the index attributes;
    determine a classification for the query;
    determine relevant data indexed for the classification; and
    determine a result for the query based on a search of the determined relevant data.

19. The system of claim 15, wherein the logic is further operable to:
    determine feedback based on the results determined; and
    modify the classification and the index based on the feedback.

20. The system of claim 15, wherein the relevance parameters comprise attributes that are determined to be relevant to defining the classification; and wherein the relevance parameters are derived from one or more data sources including unstructured data to be searched.

* * * * *